L. VERCOUTERE.
CUTTER.
APPLICATION FILED APR. 20, 1920.
1,369,581. Patented Feb. 22, 1921.
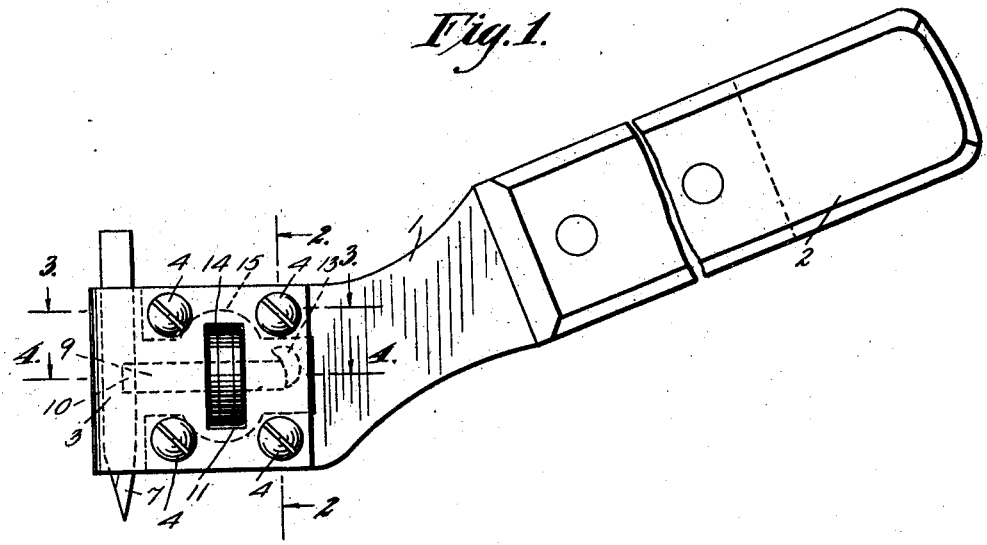
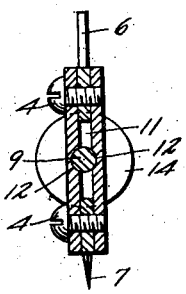
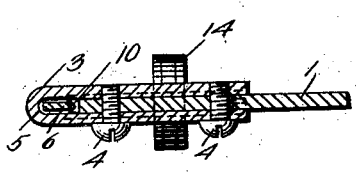
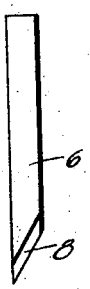
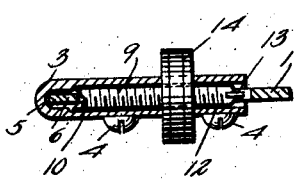
WITNESSES
INVENTOR
L. VERCOUTERE,
BY
ATTORNEYS

UNITED STATES PATENT OFFICE.

LOUIS VERCOUTERE, OF PITTSBURG, KANSAS.

CUTTER.

1,369,581. Specification of Letters Patent. Patented Feb. 22, 1921.

Application filed April 20, 1920. Serial No. 375,275.

*To all whom it may concern:*

Be it known that I, LOUIS VERCOUTERE, a citizen of the United States, and a resident of the city of Pittsburg, in the county of Crawford and State of Kansas, have invented a new and Improved Cutter, of which the following is a full, clear, and exact description.

This invention relates to improvements in cutters, an object of the invention being to provide improved means for securing a cutting blade at any desirable longitudinal adjustment relative to its support, so as to regulate the depth of the cut.

A further object is to provide a device of the character stated, which is primarily adapted for use as a tire cutter, and can be regulated to cut any number of thicknesses of canvas, or other material quickly and uniformly.

A further object is to provide a cutter which is capable of a wide range of utility in connection with various arts, and which can be manufactured and sold at a reasonably low price.

With these and other objects in view, the invention consists in certain novel features of construction and combinations and arrangements of parts, as will be more fully hereinafter described and pointed out in the claims.

In the accompanying drawings:

Figure 1 is a view in side elevation illustrating my improved cutter.

Fig. 2 is a view in section on the line 2—2 of Fig. 1.

Fig. 3 is a view in section on the line 3—3 of Fig. 1.

Fig. 4 is a view in section on line 4—4 of Fig. 1.

Fig. 5 is a view of one form of cutting blade.

1 represents the shank of my improved cutter, a handle 2 is provided on one end of the shank, and a bifurcated head 3 straddles the other end of the shank, and is secured in place by means of screws 4 or other securing device.

The portion of the shank 1 which supports the head 3 is supported at an angle to the handle end 2, and said head 3 may be conveniently formed by bending a single sheet of metal midway between its ends, so that when the head is in position on the shank a slot or opening 5 is provided for the accommodation of the cutting blade 6.

The cutting blade 6 may have a forward cutting edge 7 at its end as shown in Fig. 1, or a rear cutting edge 8 as shown in Fig. 5. As a matter of fact I provide with each cutter both forms of blades so that the device may be conveniently operated by movement in either direction.

The blade 6 is clamped in the head 3 at any position of longitudinal adjustment by means of a screw 9, the latter having a recessed end 10 to receive one edge of the blade.

The shank 1 is recessed as shown at 11, and the two side members of the head 3 are longitudinally grooved as shown at 12 to accommodate the screw 9, and the latter has a flattened, laterally projecting enlargement 13 at one end which prevents rotary movement of the screw without interfering with the longitudinal movement thereof.

A thumb nut 14 is located in slots 15 in the side members 7 of the head 3 and engages the screw 9. This nut 14 projects from both sides of the head, and is preferably knurled to facilitate its movement to adjust the screw longitudinally into clamping or released position.

The blade 5 can be easily and quickly adjusted to project the cutting end thereof the desired distance from the edge of the head in accordance with the depth of the cut desired, and can be rigidly clamped in any position.

While I have referred to my improved device as primarily adapted for use as a tire cutter, it is likewise adapted for many other uses, and hence I desire to cover broadly the device itself for any use to which it can be put.

Various slight changes might be made in the general form of the parts described without departing from my invention, and hence I do not limit myself to the precise details set forth, but consider myself at liberty to make such slight changes and alterations as fairly fall within the spirit and scope of the appended claims.

I claim:

1. A cutter of the character stated comprising a shank, a head on the shank, a cutting blade secured in said head and movable therethrough, the sharp end of said blade projecting from the head, means for locking the blade in various positions of longitudinal adjustment, said means comprising a screw positioned longitudinally of the head within the same and movable longitudinally thereof, to clamp the blade, means preventing rotary movement of the screw, and means associated with the screw for moving the same longitudinally.

2. A cutter of the character stated comprising a shank, a head on the shank, a cutting blade secured in said head and movable therethrough, the sharp end of said blade projecting from the head, means for locking the blade in various positions of adjustment, said means comprising a screw positioned longitudinally of the head within the same and removable longitudinally thereof, to clamp the blade in position, means preventing rotary movement of the screw, said head having a transverse slot therein, a thumb nut around the screw, and presenting a roughened periphery through said slot, the walls of said slot preventing lateral movement of the nut whereby a turning movement of the nut imparts longitudinal movement to the screw.

3. A cutter of the character described, comprising a bifurcated head straddling the end of the shank and having its intermediate portion spaced from the end thereof, a blade movable between the intermediate portion of the bifurcated head and the end of the shank, said shank having a longitudinal slot therein, a screw movable longitudinally in the slot to clamp the blade in various positions of adjustment, alined openings in the shank and head, a thumb nut around the screw located in said openings, means preventing rotary movement of the screw, and means compelling longitudinal movement of the screw when the nut is turned.

LOUIS VERCOUTERE.